2,813,846
Patented Nov. 19, 1957

2,813,846

HARDENING CONDENSATION PRODUCTS OF FURFURYL ALCOHOL

Eduard Farber and Matthew Sciascia, Washington, D. C., assignors to Timber Engineering Company, Washington, D. C., a corporation of Delaware No Drawing. Application April 8, 1955,
Serial No. 500,291

14 Claims. (Cl. 260—67)

This invention relates to a method for the conversion of intermediate stage furfuryl alcohol condensation products to hard coherent resins. More particularly, the invention embraces a method whereby intermediate stage furfuryl alcohol condensation products useful, inter alia, as adhesives and molding compositions, are converted to hard coherent resins by application of a novel catalyst and buffer combination. The invention further relates to the production of laminated structures, in which the laminae are bonded by furfuryl alcohol condensation product adhesives converted or set by such catalyst and buffer combinations.

The lumber industry has long sought adhesives which are effective at atmospheric or room temperatures to provide suitable bonds between the wood laminae to permit the laminated structures to be removed from clamps in relatively short clamping times. Adhesives heretofore proposed have, in many instances, proved undesirable, resulting in chemical attack upon the wood, lacking in resistance to acid and alkaline conditions, and for other reasons.

It is accordingly a primary object of the present invention to provide a method for converting intermediate stage furfuryl alcohol condensation products to coherent resinous materials effective to provide satisfactory adhesive bonds at room temperature in laminated structures, such as plywood and other laminated wood structures.

It is a further primary object of the invention to provide a method for cold-setting an intermediate stage furfuryl alcohol condensation product.

It is a further object of the invention to provide a method for setting furfuryl alcohol condensation products at room temperature, whereby such condensation products can effectively be employed as molding compositions.

It is a further and specific object of the invention to provide a process wherein one or more laminae are bonded together by an intermediate stage furfuryl alcohol condensation product adhesive, the adhesive being set by the application thereto of the catalyst and buffer combination of the invention.

It is an additional object of the invention to provide a process for setting intermediate stage furfuryl alcohol condensation product adhesives at room temperature to a stage effective to permit laminated wood structures in which such adhesive is employed as the bonding agent to be removed from the clamps in a short period of time, normally in a period of not more than 10 to about 30 minutes.

It is known in the art to prepare resinous condensation products of furfuryl alcohol which range in degree of condensation from water-insoluble oily materials to solid, infusible, resinous products. The resinous adhesive materials which are contemplated by the invention comprise intermediate stage furfuryl alcohol condensation products. Various methods are known for the production of such condensation products, one such method being described and claimed in prior Farber Patent No. 2,445,137, the specification of which is incorporated herein by reference. The art is well cognizant of the various other methods for the production of such intermediate stage furfuryl alcohol condensation products. The intermediate stage furfuryl alcohol condensation products may be modified to contain not more than about 30%, preferably from about 10% to about 20% by weight of chemically combined formaldehyde, as disclosed, for example, in Patent 2,564,653, by the inclusion of an appropriate amount of formaldehyde in the condensation reaction mixture.

The intermediate stage furfuryl alcohol condensation products contemplated by this invention are somewhat viscous fluid materials which are insoluble in water and in most water-insoluble organic solvents. Solutions in lower alcohols and ketones can be readily prepared. Appropriate solvents include methyl alcohol, ethyl alcohol, propyl alcohol, butyl alcohol, isopropyl alcohol, isobutyl alcohol, methylethyl ketone, acetone, diethyl ketone, methylpropyl ketone, ethylisopropyl ketone, ethylpropyl ketone, and the like. Solutions containing from about 50% to about 75% by weight of the intermediate stage condensation products, which may or may not be furfuryl alcohol modified by formaldehyde, are contacted or otherwise admixed or treated with a catalyst-buffer combination which is effective to convert the intermediate stage resin to a coherent resinous body at room temperature in a relatively short time, normally not more than about 60 minutes, and preferably from about 10 to about 40 minutes.

Catalysts which are contemplated for use in the invention comprise the various organic sulfonic acids derived from hydrocarbons and aniline, including sulfanilic acid and aliphatic sulfonic acids, such as pentyl sulfonic acid, decyl sulfonic acid, dodecyl sulfonic acid, tetradecyl sulfonic acid, hexadecyl sulfonic acid, and the like, which contain at least 5, preferably from about 12 to about 20 carbon atoms. Such sulfonic acids can be represented by the formula R—SO$_3$H wherein R is a hydrocarbon radical having at least 10 carbon atoms. The preferred sulfonic acid comprise alkyl aryl sulfonates in which the aryl group is a phenyl group, and in which the alkyl group contains from 10 to 20 carbon atoms. One class of such alkyl aryl sulfonic acids is disclosed in Lewis Patent No. 2,477,383.

Such alkyl aryl sulfonic acids can be represented by the formula

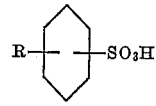

in which R is a hydrocarbon radical containing at least 5, preferably 10 to 20 carbon atoms. Representative hydrocarbon radicals include decyl, isodecyl, dodecyl, isododecyl, tetradecyl, isotetradecyl, hexadecyl, isohexadecyl, octadecyl, and isooctadecyl radicals. Analogous alkyl aryl sulfonic acids in which the aryl group or radical is derived from poly-nuclear aromatic hydrocarbons, including naphthalene, are contemplated by the invention. The aforementioned aliphatic groups represented by the symbol R in the above structural formulae may be derived from any desired source, including olefin polymers, waxes, and any other source of long chain hydrocarbon radicals. The essential feature of the sulfonic acid resides in the sulfonic acid group rather than in the specific nature of hydrocarbon radical to which the sulfonic group is attached. The aforementioned organic acid catalysts, in combination with appropriate buffering agents in accordance with the invention, are effective to convert the fluid intermediate stage furfuryl alcohol condensation products into permanently set resins within several minutes without the application of external heat, and to produce a final set material which is characterized by a minimum of acidity, preferably a pH of not more than about 3 after several hours.

The setting of the intermediate stage furfuryl alcohol condensation products by the method of this invention proceeds to a rubbery stage which may not be apparent upon inspection. In all cases, the invention is effective, however, to convert the intermediate stage furfuryl alcohol resins to the rubbery or gel stage rapidly, normally within a period of not more than about 10 to about 60 minutes. When the gel or rubbery stage is reached, the resin adhesive is sufficiently coherent to permit removal of laminated structures bonded by such adhesive from the conventional clamps, such as those which supply a clamping pressure of 100 to 300 pounds per square inch.

The buffering agents which are employed in the invention must be effective to cooperate with the catalyst in achieving the desired speed of setting at room temperature without adversely interfering with the catalytic effect. Buffering agents which have proved satisfactory for this purpose comprise benzidine, aluminum acetate, and combinations of benzidine and aluminum acetate with each other and with inorganic bases, particularly calcium oxide and calcium carbonate, which are appropriately employed in amounts equal to not more than about 50% of the weight of the buffer. The preferred range is from about 20% to about 100% of the weight of the buffer. The term "buffer" is used herein in its conventional sense to embrace substances which, when added to the intermediate stage furfuryl alcohol condensation product-containing compositions here under consideration, resist change in the hydrogen ion concentration which might result from the addition of the organic acid catalysts employed. All buffers capable of achieving this result and which do not interfere with the catalytic action of the organic acid are contemplated.

In the preferred practice of the invention, the organic acid catalyst is employed in an amount equal to at least 5, preferably about 5 to about 10 parts by weight of such catalyst for each 100 parts by weight of the intermediate stage furfuryl alcohol condensation product. Similarly, the buffering agent is employed in an amount from about 1 to about 5 parts by weight for each 100 parts by weight of intermediate stage furfuryl alcohol resinous condensation product to be converted. In those cases where final acidity is not a governing factor, quantities of sulfonic acid substantially in excess of the limit of the preferred range, above identified, can be utilized. Utilization of such large quantities of catalyst require corresponding large amounts of buffering agent.

The effect of the catalyst is not a direct and simple function of the acidity as measured by extracting the final product in water and determining the pH of the water solution under comparable conditions as to dilution, temperature, and extraction time. In certain acidic catalysts, it has been found that the products with a final pH of about 1.9 have required a much longer time for setting from the fluid to the hard state than analogous products having a final pH of 2.5 or higher. On the other hand, catalysts of the type contemplated by this invention, modified by appropriate buffers, produce a final pH in excess of 5 while at the same time effecting conversion of the intermediate stage product to a hard resin.

The method of this invention is effective to set intermediate stage furfuryl alcohol condensation products at room temperatures, more specifically, at temperatures of about 20° C. A preferred temperature range is from about 15° C. to about 40° C. to reach the rubbery or gel stage in a period of not more than about 30 minutes.

It will be apparent that particularly when the intermediate stage furfuryl alcohol condensation products which are converted or set by the method of this invention are employed as molding compositions, conventional inert fillers may be included. Suitable proportions of fillers include up to about 50% by weight, based on the total weight of the intermediate stage condensation product employed. Any conventional filler, such as sawdust, and the like, can be used. The specific type and concentration of filler does not constitute a salient feature of the invention.

The method of this invention makes feasible the production of laminated structures, such as plywood, through the use of intermediate stage furfuryl alcohol condensation products as a cold-setting adhesive. In a preferred practice of the invention for the manufacture of such laminated structures, a solution of intermediate stage furfuryl alcohol condensation product in an appropriate solvent and in the proportions as above described, is prepared and the requisite amount of buffer combined therewith. The resulting combination is spread on one of the surfaces of the wood to be joined. An aqueous solution of the organic acid catalyst is applied to the other of the wood surfaces to be joined, and the so treated surfaces are then mated in conventional manner to form a laminate, and maintained under pressure in a conventional press for a period of generally not more than about 30 minutes. Conventional laminating pressures on the order of about 150 pounds per square inch are adequate. Laminated structures may also be formed by the application of a complete composition including resin, catalyst, and buffer to one or both of the surfaces to be joined.

*Example I*

A. A typical intermediate stage furfuryl alcohol condensation product was prepared by mixing 227 parts by weight of furfuryl alcohol at room temperature of about 20° C. with 20 parts by weight of a water solution containing 5% by weight of nitric acid. The solution so formed was heated to a temperature of about 65° C. and maintained at this temperature for about 15 minutes under agitation and regulated temperature control to produce a resinous fluid which was separated from the reaction mixture and cooled. The aqueous solution which was separated from the resinous product was recovered for reuse in the resin conversion process. The resin product comprising an intermediate stage condensation product of furfuryl alcohol was washed with water. After separating the wash water, the intermediate stage condensation product weighed about 180 grams. The wash water recovered from the resin washing operation contained some soluble forms of furfuryl alcohol and various by-products of the reaction.

B. Example IA was repeated with the exception that in this instance 100 parts by weight of a technical formaldehyde solution containing 37% by weight of formaldehyde was included in the reaction mixture. The resinous condensation product formed is recovered and washed in the same manner as described in Example I.

*Example II*

60 parts by weight of the resinous product produced in Example IA was dissolved with a mixture of 30 parts by weight of acetone and 10 parts by weight of methylethyl ketone. A solution of equal parts by weight of water and an alkyl phenyl sulfonic acid (a commercial product of the Indoil Company) was prepared. 10 parts by weight of this solution were added to the solution of the resin in acetone and methylethyl ketone. 2 parts by weight of benzidine were dissolved in the resulting mixture. After the addition of benzidine at a temperature of about 20° C., the mixture was permanently set within about 30 minutes, and after 2 hours the resin was fully converted into a hard, coherent, resinous body. 10 parts by weight of the hard resin so produced was ground and mixed with 50 parts by weight of distilled water. The water remained colorless.

Maplewood billets were formed into a laminated wood structure through utilization of the embodiment of the invention represented by this example. In the formation of such laminated structure, the ketone solution of the intermediate stage furfuryl alcohol condensation product was admixed with a benzidine solution of the type described above. The sulfonic acid catalyst was not included in the solution but was formed as a separate aqueous solution of the same type as previously described.

One of the surfaces of the maplewood billets to be joined was coated with the intermediate stage condensation product resin solution containing the benzidine. The other surface to be joined was coated with the aqueous solution of sulfonic acid, and the two surfaces were then joined in conventional manner and the resulting laminate placed in clamps at a pressure of about 150 pounds per square inch for a period of about 10 minutes after which time it was found that the bond formed by the adhesive was sufficiently strong to permit the laminate to be removed from the clamps. The billets were stored for about 7 days and were then subjected to a shear test of the same type as described in Farber Patent No. 2,697,090. This test gave a shear value of about 2500 to about 3000 pounds per square inch.

*Example III*

Example II was repeated with the exception that a formaldehyde modified resinous product, of the type produced in Example IB, was employed in lieu of that utilized in Example II. Similar results were obtained.

*Example IV*

Example III was repeated with the exception that 3 grams of aluminum acetate were used in lieu of the benzidine. The resulting reaction mixture gelled and hardened in approximately the same time and with the same result as that obtained in Example II. The pH of the water extract of the ground set resin was about 3.0.

*Example V*

Example II was repeated with the exception that there was included in the catalyst-buffer combination 2 grams of calcium carbonate. The reaction mixture gelled in about 30 minutes and hardened in about 2 hours. The final product when extracted with water produced a solution having a pH of about 5.8.

Lamination of wooden billets to produce laminated structures through utilization of the catalyst-buffer combination of this example in conjunction with the described furfuryl alcohol intermediate stage condensation produce gave results analogous to those described in Example II.

Similar results are obtained when calcium oxide is substituted for calcium carbonate in this example. Calcium oxide is effective to reduce the gelling time to about 2 to 5 minutes and to produce a pH in the extract of the final hardened resinous product of about 3.65.

*Example VI*

To 100 parts by weight of a solution of an intermediate stage furfuryl alcohol condensation product, as described in Example IA, approximately 5 parts by weight of finely divided sulfanilic acid was added. The resulting mixture gelled in about 1 hour and hardened in about 10 hours. Repetition of this experiment modified by the addition of 2 parts by weight of benzidine to the initial mixture gives rise to an initial gelling of the intermediate stage furfuryl alcohol condensation product in about 20 minutes and the formation of a final hard resin in about 6 hours. The water extract of the hard resin was characterized by a pH of 3.2.

Repetition of this example, utilizing aluminum acetate in lieu of benzidine, gives rise to analogous results. Maple billets, when bonded to form a wood laminate in the manner described in Example II, are characterized by properties similar to those obtained in the laminating operation described in Example II.

It will be appreciated that the compositions of the invention can be employed as molding compositions in conventional manner, as illustrated by the following example:

*Example VII*

An intermediate stage furfuryl alcohol condensation product of the type described in Example IA was combined with about 20 parts by weight of a particulate wood filler and admixed with about 10 parts by weight of tetradecyl benzene sulfonic acid for each 100 parts by weight of resin present, and about 5 parts by weight of benzidine for each 100 parts by weight of resin present. The resulting mixture was shaped into the desired configuration, and set in a period of about 10 minutes to a coherent shape-retaining mass, and finally set into a hard, resinous material in several hours.

While the invention has been described particularly with reference to the lamination of wood, it may be employed to produce laminated structures from all other types of laminae, including metal, glass, resinous laminae, and the like.

We claim:
1. The process of converting a liquid, resinous intermediate stage furfuryl alcohol condensation product into a hard resin without external heating which comprises contacting said condensation product with a mixture of an organic acid selected from the group consisting of the sulfonic acids and sulfanilic acids, said acid being employed in combination with a buffer selected from the group consisting of benzidine and aluminum acetate, there being employed at least about 5 parts by weight of said organic acid for each 100 parts by weight of said condensation product and at least about 1 part by weight of said buffer for each 100 parts by weight of said condensation product.

2. The process of claim 1 wherein said furfuryl alcohol condensation product contains from about 10% to 30% by weight of chemically combined formaldehyde.

3. The process of claim 1 wherein there is employed a combination of an aliphatic sulfonic acid catalyst and a benzidine buffer.

4. The process of claim 1 wherein there is employed a combination of an aliphatic sulfonic acid catalyst and an aluminum acetate buffer.

5. The process of claim 1 wherein said liquid intermediate stage furfuryl alcohol condensation product is employed in the form of a solution in an organic solvent.

6. The process of claim 1 wherein the said buffer comprises a mixture of benzidine and a material selected from the group consisting of calcium oxide and calcium carbonate.

7. The process of claim 1 wherein the buffer comprises aluminum acetate and a material selected from the group consisting of calcium oxide and calcium carbonate.

8. In a process wherein laminae are bonded together through utilization of an adhesive comprising an intermediate stage furfuryl alcohol condensation product, the step which comprises converting said condensation product to a hard coherent resin effectively bonding said laminae together by contacting, without external heating, said condensation product with an organic acid selected from the group consisting of the sulfonic acids and sulfanilic acids, said acid being employed in conjunction with a buffer selected from the group consisting of benzidine and aluminum acetate, there being employed at least about 5 parts by weight of said organic acid for each 100 parts by weight of said condensation product and at least about 1 part by weight of said buffer for each 100 parts by weight of said condensation product.

9. The process of claim 8 wherein said buffer is benzidine.

10. The process of claim 9 wherein said benzidine buffer is employed in conjunction with a material selected from the group consisting of calcium oxide and calcium carbonate.

11. The process of claim 8 wherein said buffer is aluminum acetate.

12. The process of claim 11 wherein said aluminum acetate buffer is employed in conjunction with a material selected from the group consisting of calcium oxide and calcium carbonate.

13. The process of claim 8 wherein a solution of said condensation product containing said buffer is spread on one of the surfaces of the laminae to be joined, and a solution of the organic acid catalyst is spread on the other such surface.

14. The process of forming a laminated structure which comprises applying to one of the surfaces of the laminae to be joined a solution of an intermediate step furfuryl alcohol condensation product in an organic solvent, said solution containing a buffer selected from the group consisting of benzidine and aluminum acetate, applying to the other of the surfaces of the laminae to be joined a catalyst comprising a sulfonic acid, and thereafter joining the so coated surfaces to form the desired laminate, said process being effected without external heating, there being employed at least about 5 parts by weight of said sulfonic acid for each 100 parts by weight of said condensation product and at least about 1 part by weight of said buffer for each 100 parts by weight of said condensation product.

References Cited in the file of this patent

UNITED STATES PATENTS

| | | |
|---|---|---|
| 2,471,600 | Adams et al. | May 31, 1949 |
| 2,499,275 | McWhorter | Feb. 28, 1950 |
| 2,669,552 | Seymour et al. | Feb. 16, 1954 |

FOREIGN PATENTS

| | | |
|---|---|---|
| 625,847 | Great Britain | July 5, 1949 |
| 483,238 | Canada | May 13, 1952 |

OTHER REFERENCES

Reineck: "Modern Plastics," pp. 127, 128, 130, 132, October 1952. (Copy in Science Library.)